United States Patent [19]
Zebbedies

[11] Patent Number: 5,791,499
[45] Date of Patent: Aug. 11, 1998

[54] SHOTGUN RACK

[76] Inventor: Dieter H. Zebbedies, 4175 Springcrest Dr., Brooklyn, Ohio 44144

[21] Appl. No.: 496,337

[22] Filed: Jun. 29, 1995

[51] Int. Cl.$^6$ .................................................. A47F 7/00
[52] U.S. Cl. .......................... 211/64; 224/913; 248/122.1; 248/176.1
[58] Field of Search ................... 211/64, 88; 224/913; 248/122.1, 176.1, 177.1, 298.1, 201, 316.8, 314

[56] References Cited

U.S. PATENT DOCUMENTS

| | | | |
|---|---|---|---|
| 1,313,061 | 8/1919 | Brown | 248/122.1 X |
| 1,914,259 | 6/1933 | Irwin | 224/913 X |
| 2,708,038 | 5/1955 | Barrett | 211/88 |
| 2,763,453 | 9/1956 | Palino | 248/122.1 X |
| 2,932,544 | 4/1960 | Lambert | 211/88 X |
| 2,998,885 | 9/1961 | Surface | 224/913 X |
| 3,008,677 | 11/1961 | Grove et al. | 248/122.1 |
| 3,473,673 | 10/1969 | Porter | 211/64 |
| 3,917,071 | 11/1975 | Walters | 211/64 |
| 4,120,436 | 10/1978 | Burch | 224/64 |
| 4,560,134 | 12/1985 | Klein | 224/913 X |
| 4,852,780 | 8/1989 | Woodbury | 224/913 |
| 4,998,944 | 3/1991 | Lund | 42/94 |
| 5,026,016 | 6/1991 | Lisowski | 248/314 |
| 5,129,563 | 7/1992 | Dillon | 224/275 |
| 5,332,090 | 7/1994 | Tucker | 248/314 X |
| 5,350,094 | 9/1994 | Morford | 224/913 |
| 5,438,787 | 8/1995 | McMaster et al. | 224/913 X |

OTHER PUBLICATIONS

Chemical Agent Equipment catalog.
Santa Cruz Gunlocks catalog.

*Primary Examiner*—Robert W. Gibson, Jr.
*Attorney, Agent, or Firm*—Roger D. Emerson

[57] ABSTRACT

A firearm holding apparatus adaptable to variations in firearm design is provided. Interchangeable, modular support blocks used with or without a supporting spine provide optional firearm mounting methods. The supporting spine may be angled to accommodate the angularity of the stock end of a firearm. Also, the supporting spine may be held by a free-standing base for placement between front bucket seats in a passenger vehicle.

13 Claims, 11 Drawing Sheets

1
SHOTGUN RACK

BACKGROUND OF THE INVENTION

1. Field of Invention

This invention pertains generally to the art of securing firearms and more specifically to a modular system for securing firearms within passenger vehicles.

2. Description of the Related Art

In the art it is known to secure firearms in police cars and other passenger vehicles by mounting them to cages, interior car roofs, on the floor and in trunks. The particular configuration of a firearm such as length, angularity, barrel end configuration, and the like can vary greatly from weapon to weapon. Therefore, the need exists for a mounting system that will accommodate a wide variety of firearm designs.

Certain mounting systems such as that proposed in U.S. Pat. No. 5,350,094 to Morford attempt to address the need for a firearm support adapted for various applications. A firearm having an angled stock end provides a mounting challenge. In the apparatus of Morford, the stock end of such a firearm would not be adequately supported.

Other mounting methods such as the one proposed in U.S. Pat. No. 3,917,071 to Walters fail to adequately adapt to a wide range of firearm designs.

The present invention accommodates variations in firearm design as well as providing options in mounting applications in a way which is simple and efficient, while providing better and more advantageous results.

SUMMARY OF THE INVENTION

In accordance with the present invention, a new and improved modular system for mounting firearms within passenger vehicles is provided.

More particularly, in accordance with the invention, blocks which support the stock end and the barrel end of a firearm may be mounted directly to a vehicle surface, or to a supporting spine. The supporting spine can then be placed on a stand which rests between front bucket seats if the firearm length so permits, or the spine can be mounted to a vehicle surface such as a cage, car roof interior, or trunk surface. The modular nature of the present invention allows for variability in firearms, including such aspects as length of the firearm, angularity of the stock end, and barrel end configuration.

According to one aspect of the invention, an apparatus for holding a firearm having a stock end and a barrel end comprises a rigid support spine which has a supporting surface and first and second ends. Protruding from the supporting surface are first and second rigid supports.

The first and second supports are removably attached to the supporting surface by attaching means which extend through holes in the ends of the supporting surface and the supports.

According to another aspect of the invention, the first support comprises an end wall, first and second opposed side walls, and a floor. The floor of the first support block is contoured to receive the stock end of the firearm.

According to another aspect of the invention, a hole extends through the end wall normal to the side walls.

According to another aspect of the invention, the second support comprises first and second opposed side walls and an interior surface. The interior surface is contoured to receive the barrel end of a firearm.

According to another aspect of the invention, the second support comprises an end wall, first and second opposed side

2 walls, and an interior surface. The interior surface is contoured to receive the barrel end of a firearm. The first side wall has an edge which is inwardly sloped.

According to another aspect of the invention, a hole extends through the end wall normal to the side walls.

According to another aspect of the invention, the first and second supports have a coating of plastic or rubber to cover any screw heads and reduce marring of the firearm ends.

According to another aspect of the invention, the apparatus further comprises a stand which is removably attached to the spine. The stand comprises a base member and a leg. There is a groove in the leg for receiving the support spine.

According to another aspect of the invention, an included angle is present between the first and second ends of the support spine. The included angle measures between 135 degrees and 175 degrees.

According to another aspect of the invention, a firearm securement system for mounting a firearm having a stock end and a barrel end to an essentially planar surface comprises a first rigid support for internally receiving the stock end of the firearm and a second rigid support for internally receiving the barrel end of the firearm. The first support comprises an end wall, first and second opposed side walls, a floor, and means for removably attaching the first support to the surface. The floor of the first support is contoured to receive the stock end of the firearm. The second support comprises first and second opposed side walls, an interior surface, and means for attaching the second support to the surface. The interior surface of the second support is contoured to receive the barrel end of the firearm.

One advantage of the present invention is its adaptability to a wide variety of firearm designs. Differences in firearms, such as length of the firearm, angularity of the stock end, and barrel end configuration.

Another advantage of the present invention is the ability to quickly change mounting options.

Another advantage of the present invention is the ability to support a firearm on a base which fits between the front bucket seats without hindering the action of inflatable air bags.

Still other benefits and advantages of the invention will become apparent to those skilled in the art upon a reading and understanding of the following specification.

BRIEF DESCRIPTION OF THE DRAWINGS

The invention may take physical form in certain parts and arrangement of parts. A preferred embodiment of these parts will be discussed in detail in the specification and illustrated in the accompanying drawings, which form a part of this disclosure and wherein.

3

DESCRIPTION OF THE PREFERRED EMBODIMENT

Figure 1:
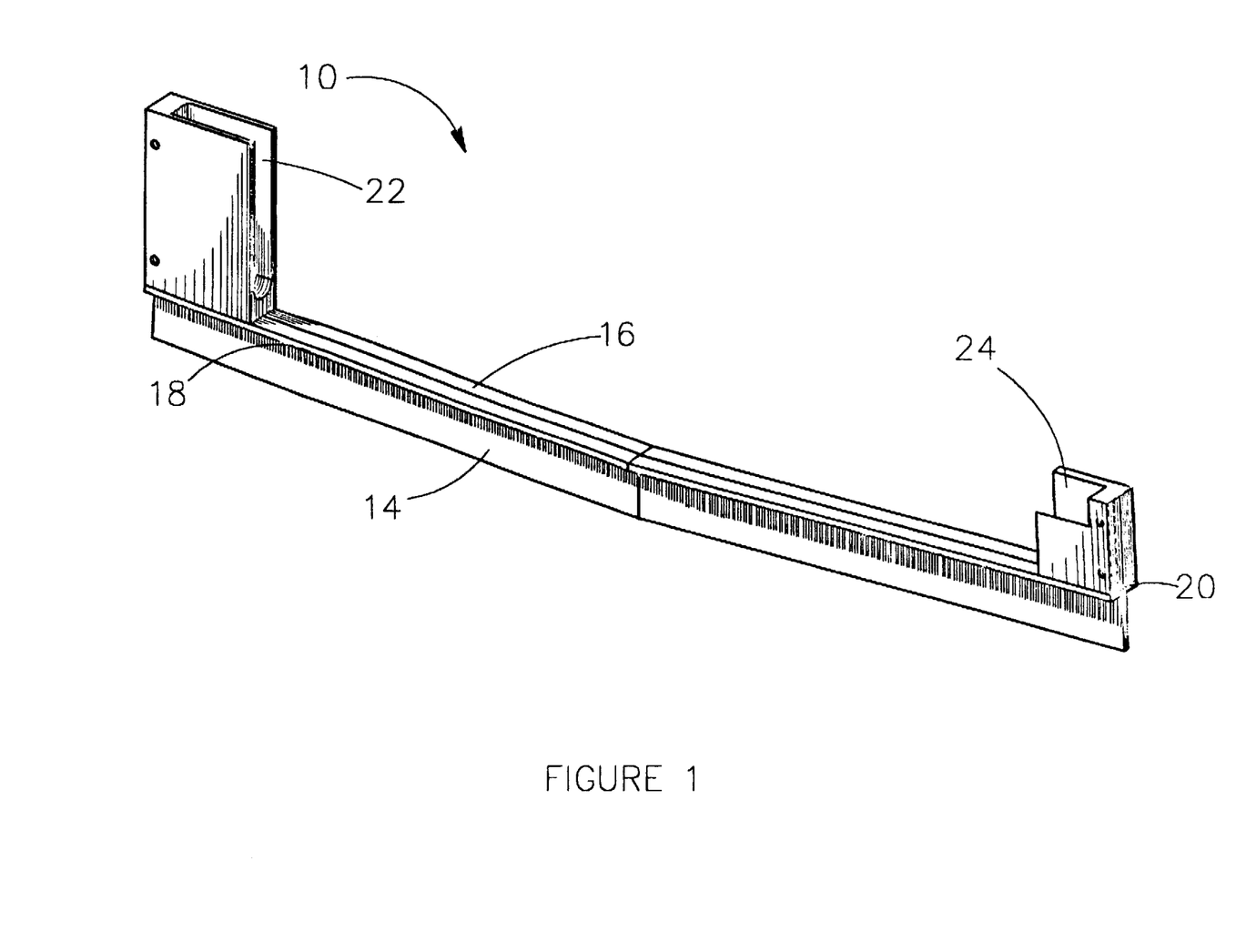
FIG. 1 is a left hand perspective view of one embodiment of the invention.
Figure 2:
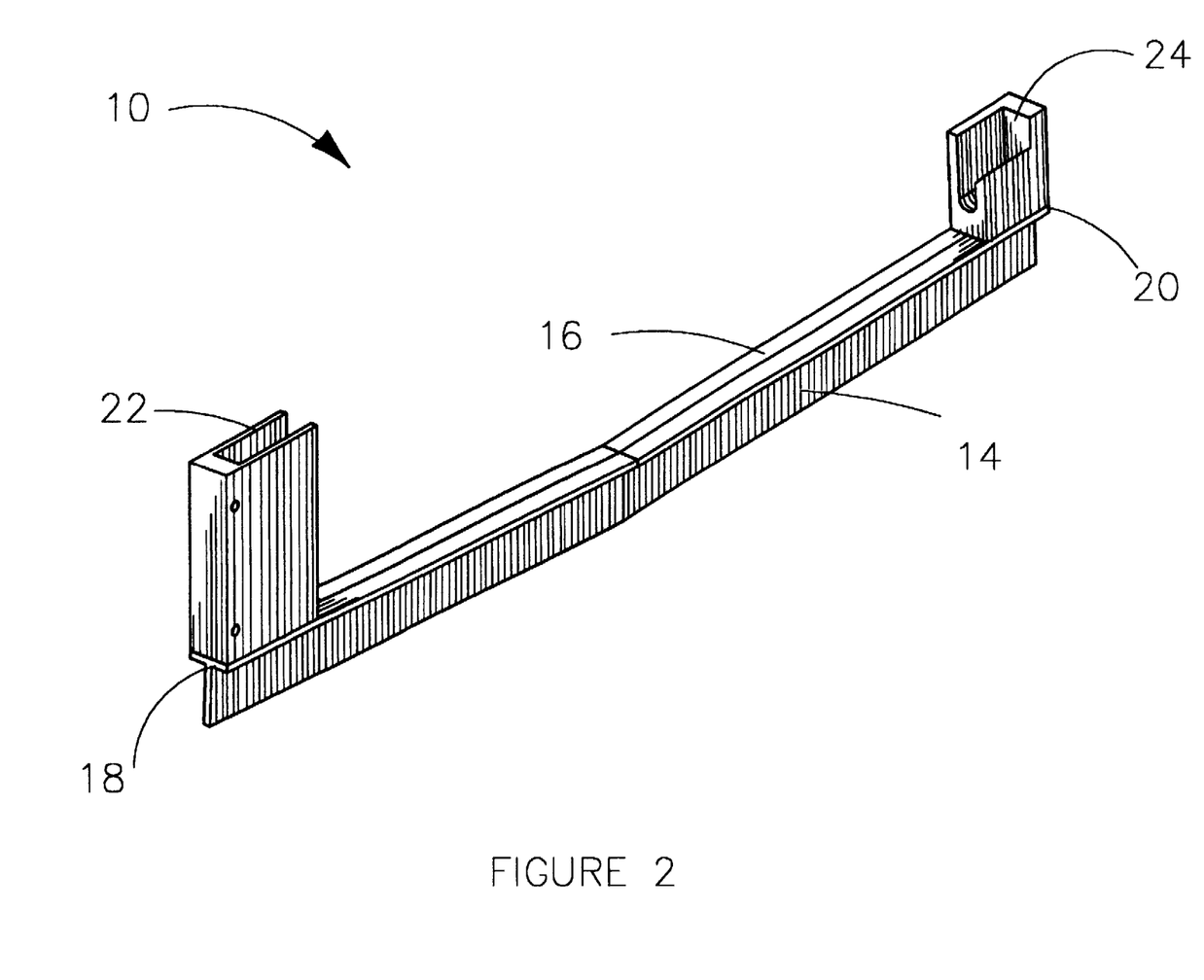
FIG. 2 is a right hand perspective view of the embodiment shown in FIG. 1.

Referring now to the drawings in which like parts may bear like reference numerals, FIGS. 1 and 2 show a preferred embodiment of a firearm holding apparatus 10 according to the invention. The holding apparatus 10 comprises a rigid support spine 14 which has a T-shaped cross section, a supporting surface 16, a first end 18, and a second end 20. Protruding from the supporting surface 16 at the first end 18 is a first support 22. A second support 24 protrudes from the supporting surface 16 at the second end 20. The first support 22 and the second support 24 are removably attached to the support spine 14 in accordance with their modular nature.

Figure 3:
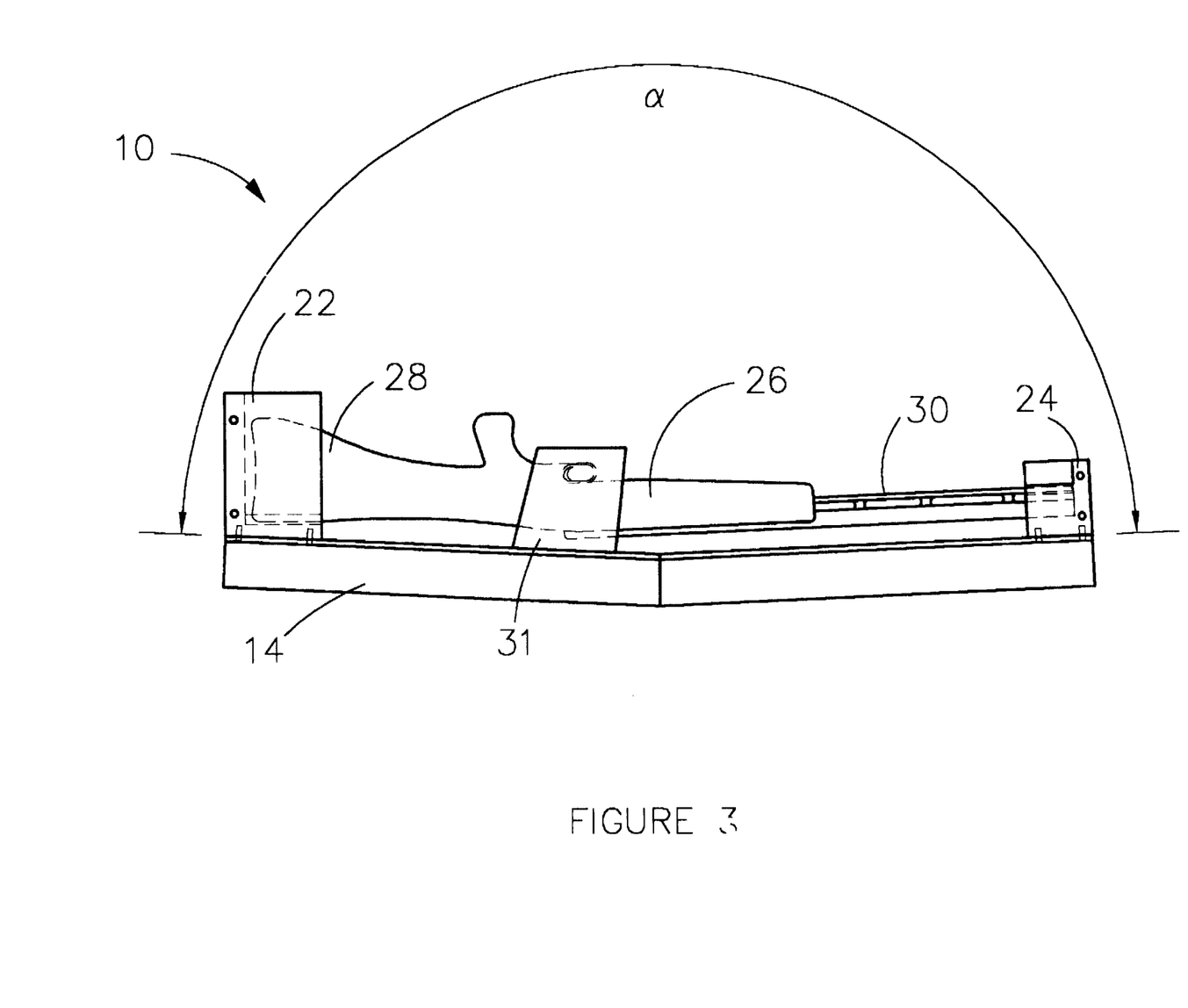
FIG. 3 is a side view of the embodiment shown in FIG. 1.

As shown in FIG. 3, the holding apparatus 10 supports a firearm 26 which has a stock end 28 and a barrel end 30. The stock end 28 is received and supported within the first support 22. The barrel end 30 is received and supported within the second support 24. The support spine 14 may be straight, or it may have an included angle, α, between the first end 18 and second end 20 to conform to the angularity of the stock end 28. In the preferred embodiment, the angle α measures between 135° and 175°. Supports 22 and 24 are fashioned from metal or other material to enable them to rigidly support the firearm 26. A trigger lock 31 such as the kind known in the art may be attached to spine 14 to safeguard the firearm 26 from unauthorized use.

Figure 4:
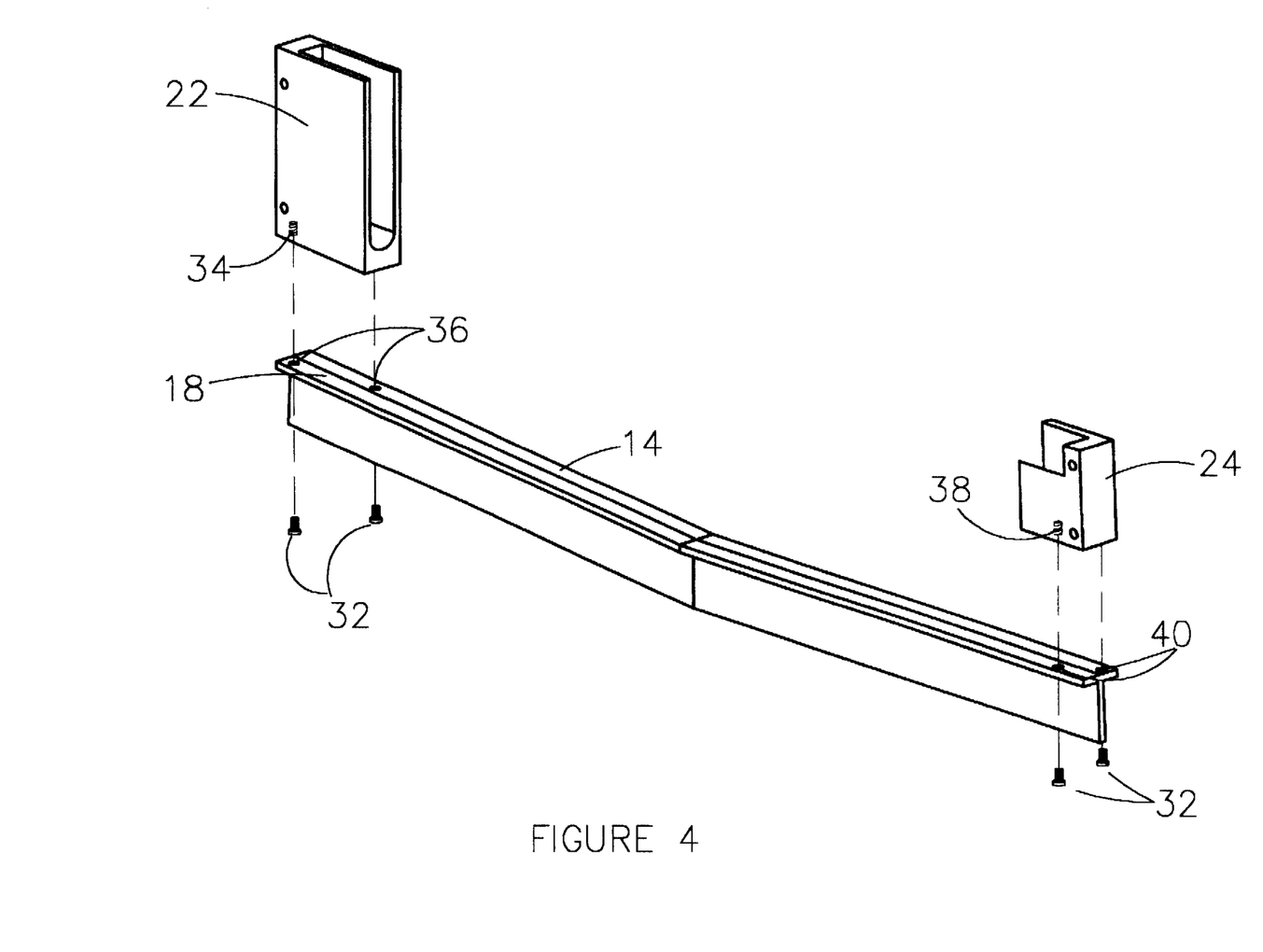
FIG. 4 is an exploded view of the embodiment shown in FIG. 1.

In FIG. 4, the removable nature of the supports 22, 24 is illustrated. In a preferred embodiment, the first support 22 has holes 34 which communicate with holes 36 at the first end 18 of the support spine 14. Attaching means 32, such as screws, extend through the holes 34,36 to removably attach the first support 22 to the support spine 14. Likewise, the second support 24 comprises holes 38 which communicate with holes 40 at the second end 20 of the support spine 14. Attaching means 32 extend through holes 38, 40 to removably attach the second support 24 to the support spine 14. Attaching means 32 are described in the preferred embodiment above, although other methods of removably attaching the supports 22,24 to the support spine 14 could be utilized. For example, the supports 22,24 could be slidably clipped to the spine 14 or held in place by a spring-loaded mechanism.

Figure 5:
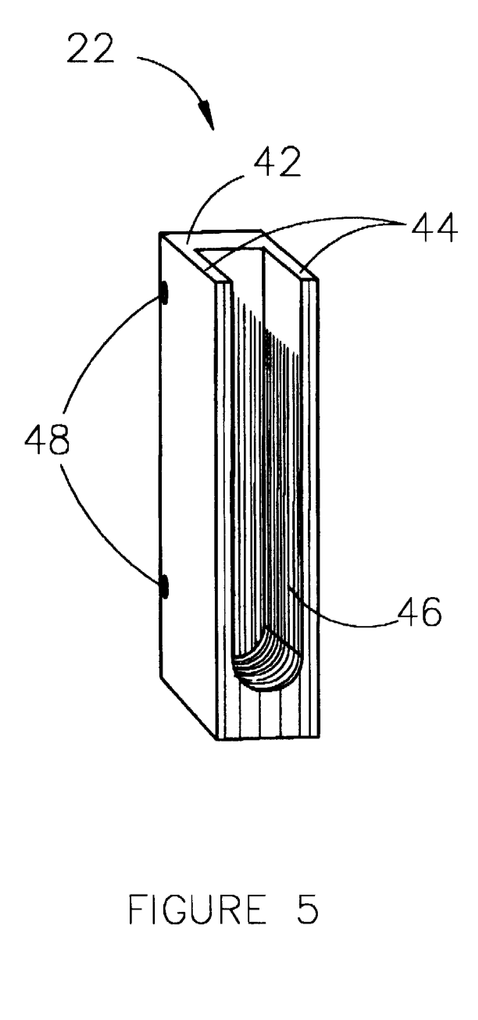
FIG. 5 is an embodiment of a first support according to the invention.

The modular nature of the present invention gives rise to various configurations of the supports 22,24 to accommodate variances in firearm design. For example, FIG. 5 shows an embodiment of the first support 22 according to the invention. The first support 22 comprises an end wall 42, opposed side walls 44, and an interior surface 46. The support 22 also comprises holes 48 which extend transversely through the side walls 44 and the end wall 42. The holes 48 may receive attaching means, not shown, to attach the first support 22 to a surface other than the support spine 14 as will be discussed later in this disclosure. The interior surface 46 is contoured to receive and support the stock end 28 of a firearm 26. In a preferred embodiment, the interior surface 46 is concave in order to support a rounded stock end 28 of a firearm 26, although other contours are possible if the firearm design so dictates.

Figure 6:
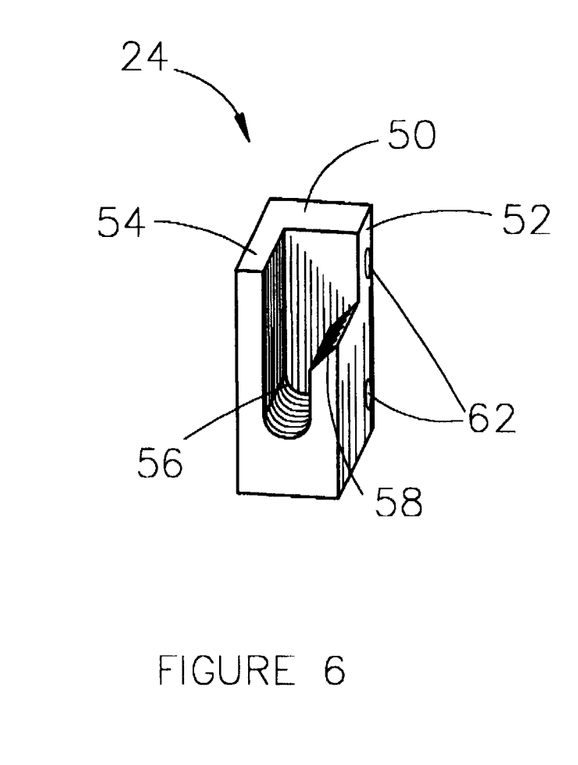
FIG. 6 is an embodiment of a second support according to the invention.
Figure 7:
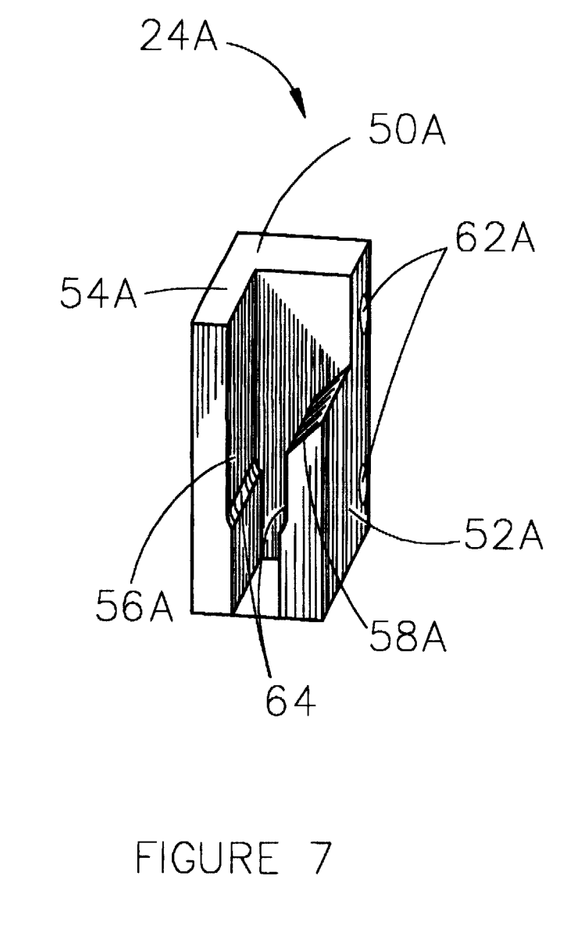
FIG. 7 is a second embodiment of a second support according to the invention.
Figure 8:
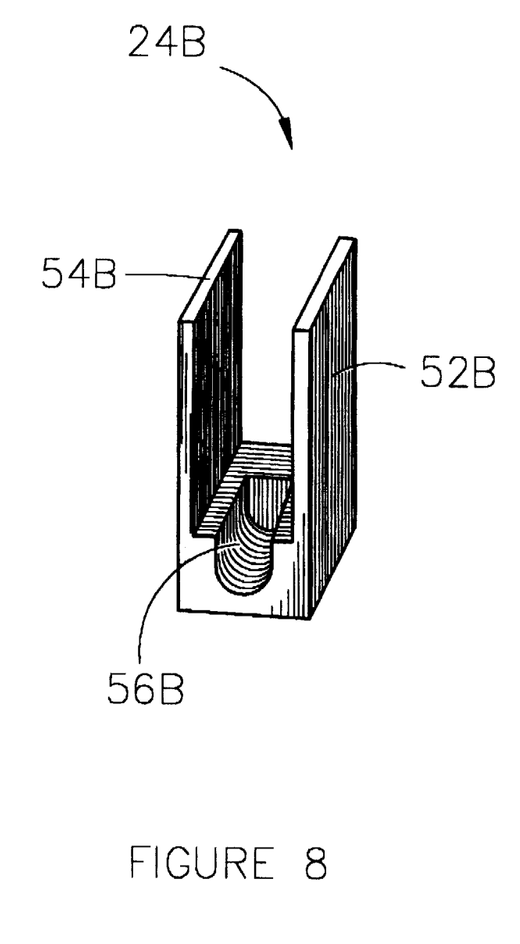
FIG. 8 is a third embodiment of a second support according to the invention.

FIGS. 6–8 depict different embodiments of the second support 24. In particular, a preferred embodiment of the second support 24 is shown in FIG. 6. The support 24 comprises an end wall 50, a first side wall 52, a second side wall 54, and an interior surface 56. The first side wall 52 has a first edge 58 which slopes inward. The purpose of edge 58 is to direct the motion of a firearm upon removal from the support 24. The firearm can be removed only in a direction essentially parallel to the plane of the sloped edge 58. The interior surface 56 is contoured to receive and support a barrel end of a firearm. In a preferred embodiment, the interior surface 56 is concave, although other contours are possible depending on the firearm design. The second support 24 may further comprise holes 62 which extend transversely through the side walls 52,54 and end wall 50. The holes 62 receive attaching means, not shown, to attach the second support 24 to a surface other than the support spine 14, as will be discussed later in this disclosure.

As shown in FIG. 7, the support 24A comprises an end wall 50A, a first side wall 52A, a second side wall 54A, and an interior surface 56A. The first side wall 52A has an inwardly sloping first edge 58A which directs the movement of a firearm upon removal from the support 24A. The interior surface 56A is contoured to receive and support a barrel end of a firearm. In the present embodiment, the interior surface 56A comprises opposed concave regions 64 which could receive and support a firearm having a double barrel design. The second support 24A may further comprise holes 62A which extend transversely through the side walls 52A,54A and end wall 50A. The holes 62A receive attaching means, not shown, to attach the second support 24 to a surface other than the support spine 14, as will be discussed later in this disclosure.

FIG. 8 shows an embodiment of a second support 24B. The support 24B comprises a first and second opposed side walls 52B, 54B, and an interior surface 56B. The interior surface 56B is contoured to receive and support a barrel end of a firearm. Extending through the interior surface 56B are holes 38B which facilitate the attachment of the second support 24B to a support spine 14.

Figure 9:
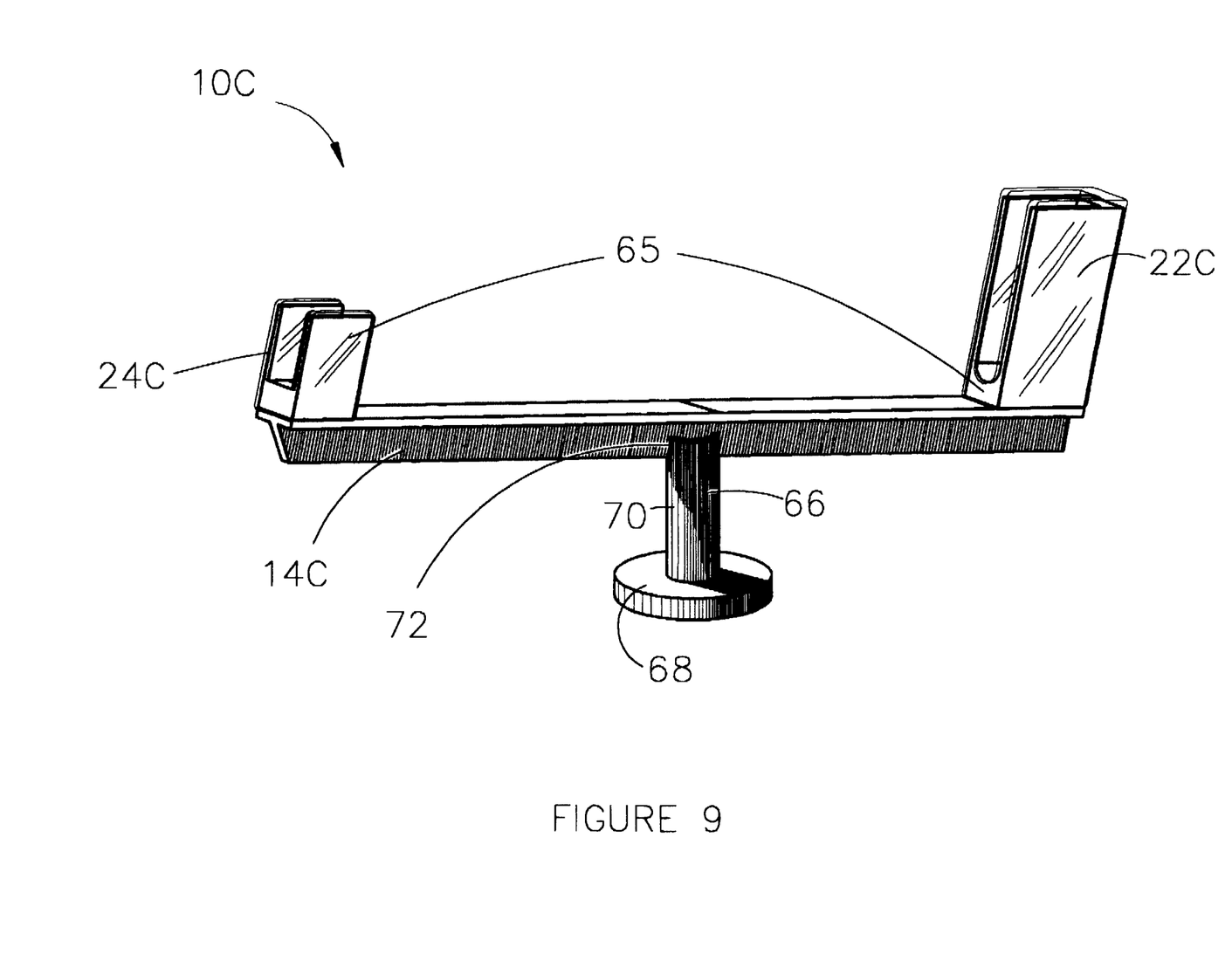
FIG. 9 is a perspective view of another embodiment of the invention.
Figure 10:
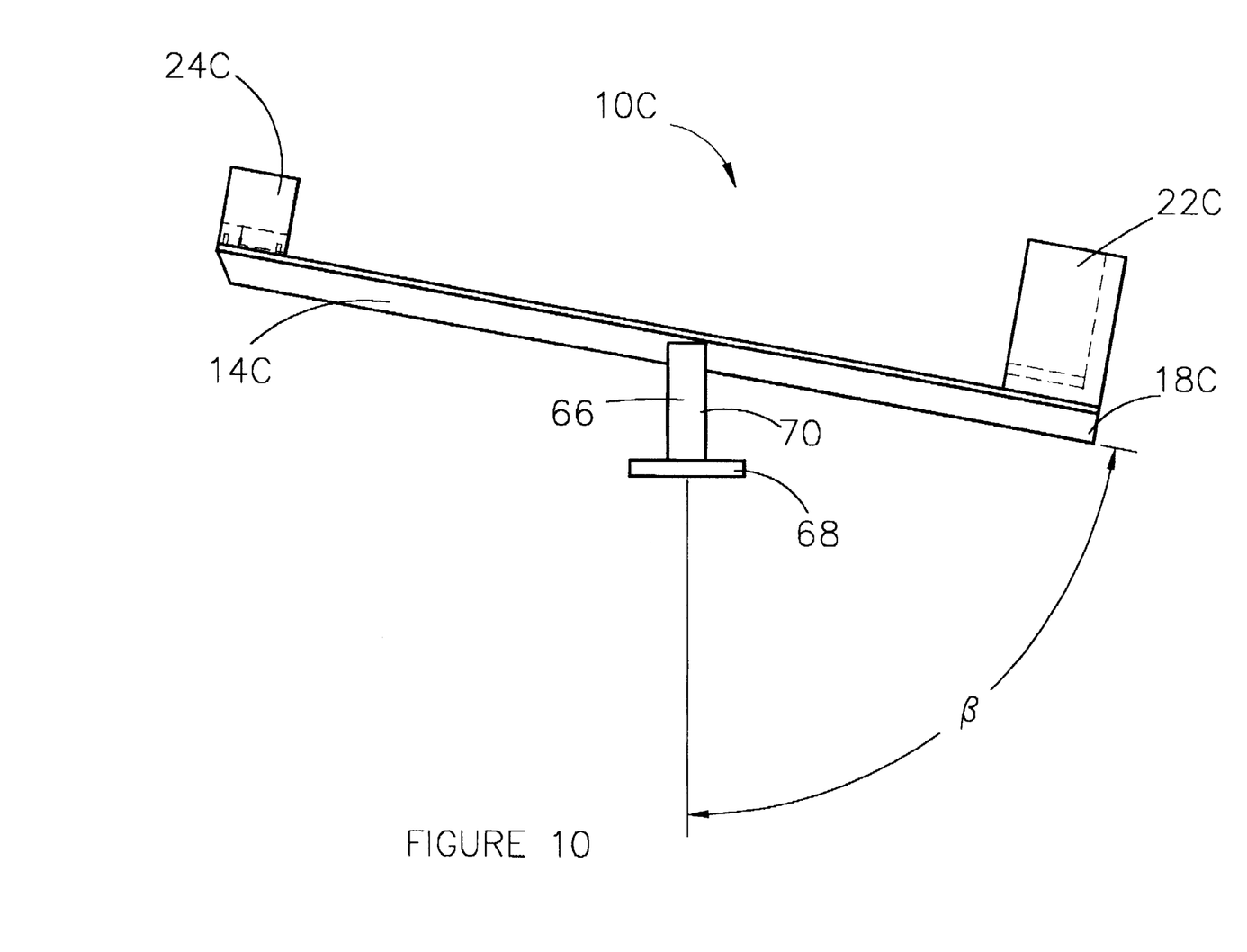
FIG. 10 is a side view with hidden lines of the embodiment shown in FIG. 9.

Referring now to FIGS. 9 and 10, another embodiment of the firearm holding apparatus 10C is shown in which the supporting spine 14C is straight. Also shown in this embodiment are first and second supports 22C, 24C which have a plastic coating 65 to reduce marring of the stock end and the barrel end of the firearm 26.

Figure 13:
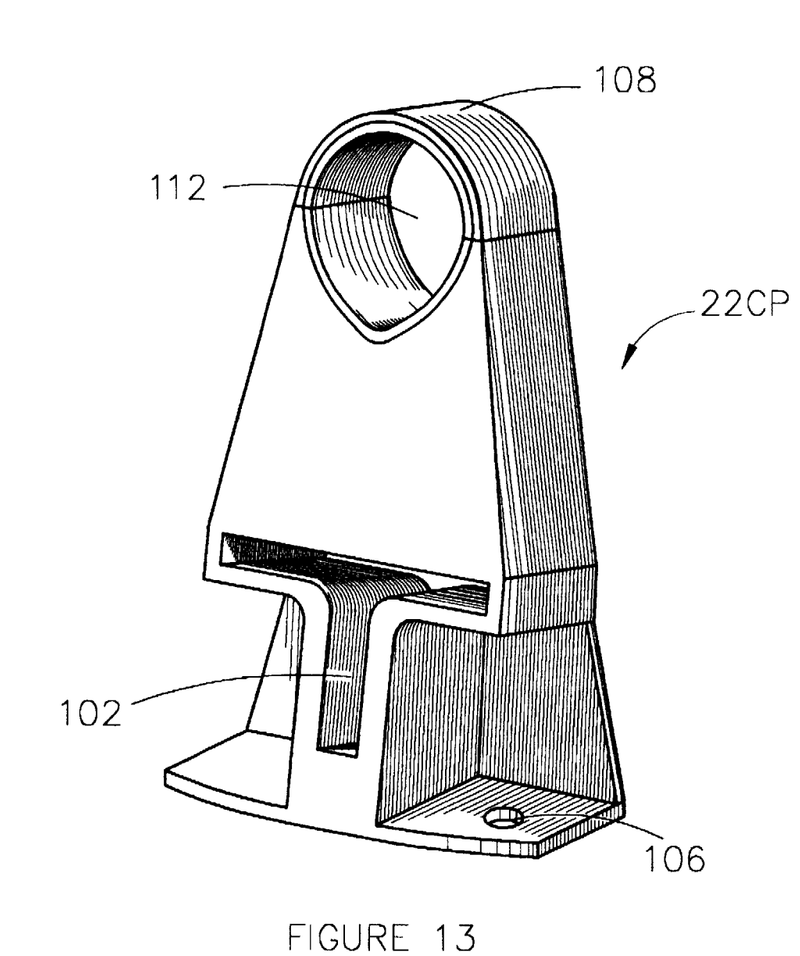
FIG. 13 shows a perspective view of an embodiment of an alternate embodiment support.

With reference to FIG. 13, an alternate and preferred embodiment of the invention the supports 22CP and 24C can be molded entirely of high strength plastic, preferably polycarbonate, known as the tradename "Lexan." Injection molding the supports 22C and 24C of this high strength plastic allows the supporting spine 14C to be inserted into a recess 102 in the support 22CP. The support 22CP can be affixed to the floor of the associated vehicle via bolt holes 106. The bolt holes prevent the support 22CP from lifting off the floor while the "T-shaped" recess 102 prevents the spine 14C from twisting. A top member 108 may be added to support 22CP to further enclose the barrel of the associated gun. The opening 112 may be configured to accommodate a gun sight.

The support spine 14C is held within a stand 66. The stand 66 comprises a base 68 and a leg 70. In this embodiment, the base 66 is disc-like and the leg 70 is cylindrical, although other configurations for the stand 66 are possible. The leg 70 has a groove 72 therein for the reception of the support spine 14C. In a preferred embodiment, the groove 72 holds the support spine 14C at an angle β, with the first end 18C also stabilizing the firearm holding apparatus 10C. The addition of the stand 66 allows the firearm 26 holding apparatus 10C to be free-standing. Such an arrangement permits the use of the firearm holding apparatus 10C between front bucket seats of a passenger vehicle without hindering the operation of inflatable air bags.

Figure 14:
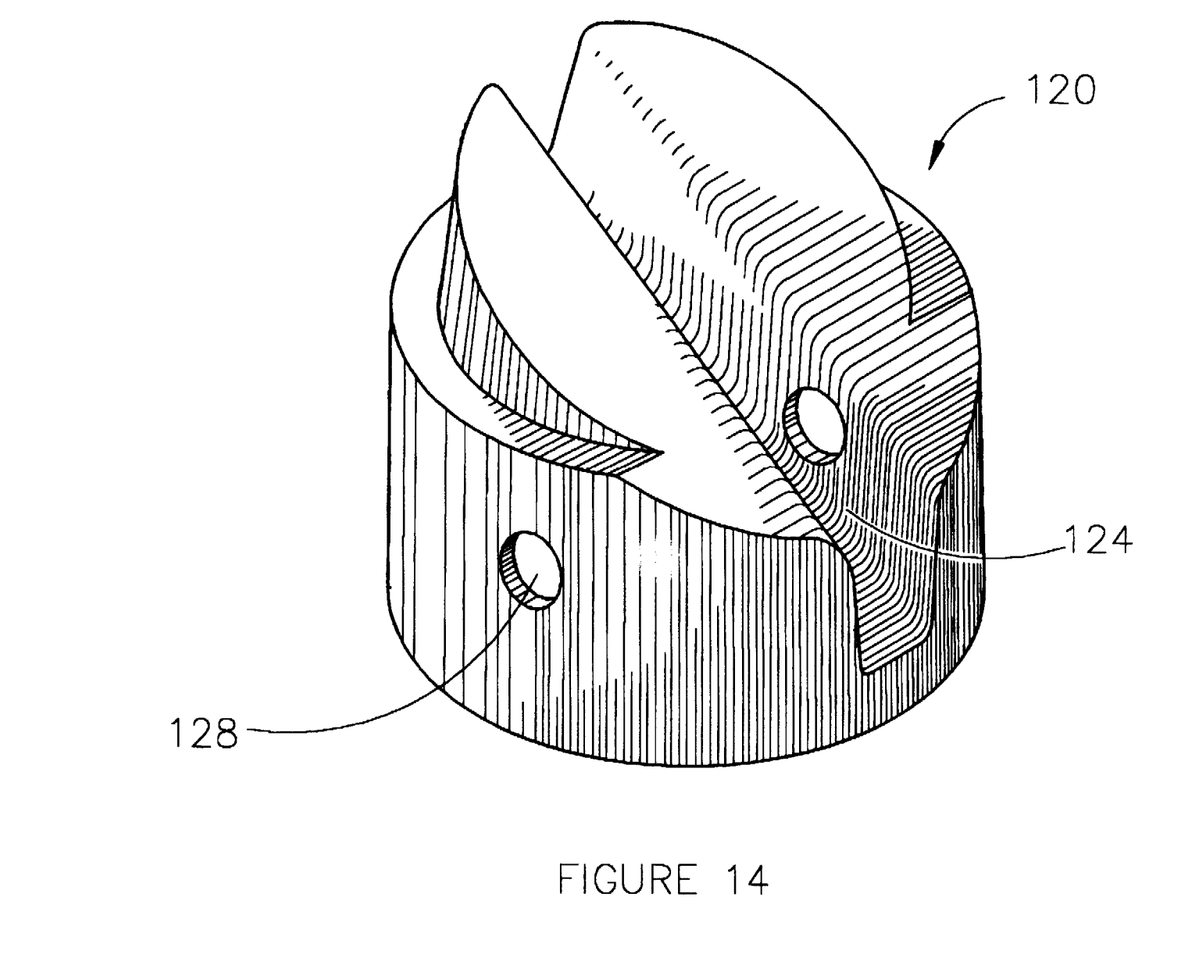
FIG. 14 shows a perspective view of an alternate embodiment of the invention, one utilizing a cap.

With reference to FIG. 14, another embodiment of the invention includes cap 120. An alternate method and structure of attaching the spine 14C to the tube 70 includes cap 120. The cap 120 fits onto the top of tube 70. The top of tube 70 is rough cut at an angle. The cap 120 has interior shoulders which fit over and grip the top of the rough cut tube 70. In this embodiment, the spine 14C fits into groove 124 and is retained there by a bolt (not shown) which fits into hole 128, thereby securing cap 120, spine 14C and tube 70.

Figure 11:
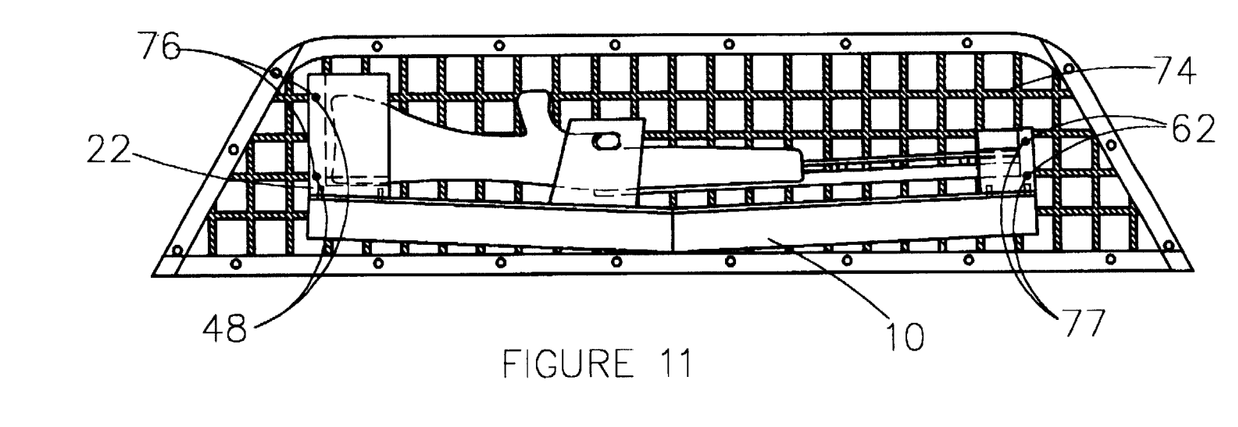
FIG. 11 shows a side view of an embodiment of the invention shown mounted on an essentially planar surface.

Referring now to FIG. 11, one manner in which the firearm holding apparatus 10 may be mounted to an essentially planar surface 74 is provided. The planar surface 74 may be a passenger car interior roof, a trunk interior, or a security screen, among other surfaces. Holes 48 in the first support 22 and holes 62 in the second support 24 receive attaching means 76 and 77, respectively. Attaching means 76,77 extend through the holes 48, 62 and into the planar surface 74.

Figure 12:
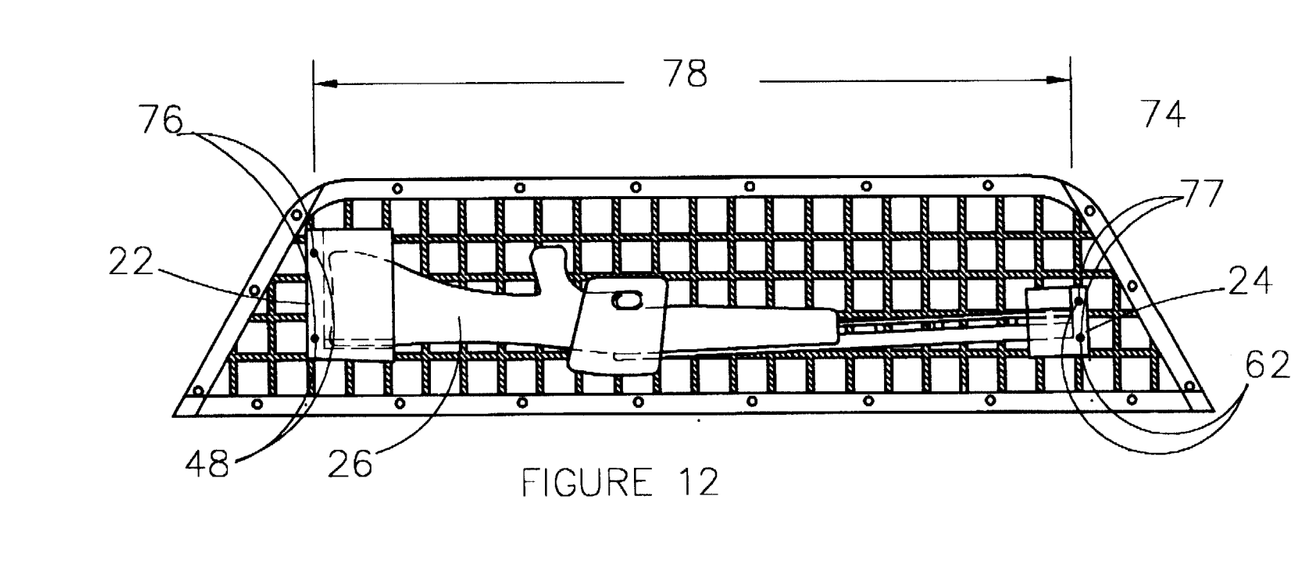
FIG. 12 shows a side view of another embodiment of the invention shown mounted on an essentially planar surface.

As shown in FIG. 12, the first support 22 and the second support 24 may be used without a support spine. First support 22 is attached to an essentially planar surface 74 by attaching means 76 which extend through holes 48. Likewise, second support 24 is attached to surface 74 a distance 78 from first support 22 by attaching means 77 which extend through holes 62. The distance 78 between first support 22 and second support 24 is dependent upon the firearm 26 to be mounted.

The present invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalents thereof.

Having thus described the invention, it is now claimed:

1. An apparatus for holding a firearm having a stock end and a barrel end, said apparatus comprising:
   a rigid support spine, said spine comprising a supporting surface and spaced apart first and second ends;
   a first rigid support, said first support protruding from said surface at said first end, said first support comprising an end wall, said end wall having a hole therein, said hole extending transversely to said supporting surface, first and second opposed side walls, said side walls being separated by said end wall, and a floor, said floor being contoured to receive said stock end of said firearm;
   first attaching means for removably attaching said first support to said surface;
   a second rigid support, said second support protruding from said surface at said second end; and,
   second attaching means for removably attaching said second support to said surface.

2. An apparatus for holding a firearm having a stock end and a barrel end, said apparatus comprising:
   a rigid support spine, said spine comprising a supporting surface and spaced apart first and second ends;
   a first rigid support, said first support protruding from said surface at said first end;
   first attaching means for removably attaching said first support to said surface;
   a second rigid support, said second support protruding from said surface at said second end, said second support comprising an end wall, said end wall having a hole therein, said hole extending transversely of said supporting surface, first and second opposed side walls, said side walls being perpendicular to said end wall, said first side wall having an edge, said edge being inwardly sloped, and an interior surface, said interior surface being contoured to receive said barrel end of said firearm; and,
   second attaching means for removably attaching said second support to said surface.

3. An apparatus for holding a firearm having a stock end and a barrel end, said apparatus comprising:
   a rigid support spine, said spine comprising a supporting surface and spaced apart first and second ends having an included angle between said first end and said second end, said included angle measuring between 135 and 175 degrees;
   a first rigid support, said first support protruding from said surface at said first end;
   first attaching means for removably attaching said first support to said surface;
   a second rigid support, said second support protruding from said surface at said second end; and,
   second attaching means for removably attaching said second support to said surface.

4. The apparatus of claim 1 wherein:
   said first end has first holes therein and said first support has holes therein, said holes communicating with said first holes, said attaching means extending into said first holes; and wherein:
   said second end has second holes therein and said second support has holes therein, said holes communicating with said second holes, said attaching means extending into said second holes.

5. The apparatus of claim 1 wherein the second support comprises;
   first and second opposed side walls; and,
   an interior surface, said interior surface being contoured to receive to said barrel end of said firearm.

6. The apparatus of claim 1 farther comprising a stand, said stand being removably attached to said spine, said stand comprising:
   a base member; and,
   a leg, said leg being normal to said base member, said leg having a groove therein for the reception of said spine.

7. The apparatus of claim 1 wherein said spine further comprises a T-shaped cross section.

8. The apparatus of claim 3 wherein said first support comprises:
   an end wall;
   first and second opposed side walls, said side walls being separated by said end wall; and,
   a floor, said floor being contoured to receive said stock end of said firearm.

9. The apparatus of claim 8 wherein said end wall has a hole therein, said hole extending transversely to said supporting surface.

10. The apparatus of claim 3 wherein said second support comprises:

an end wall;

first and second opposed side walls, said side walls being perpendicular to said end wall, said first side wall having an edge, said edge being inwardly sloped; and, an interior surface, said interior surface being contoured to receive said barrel end of said firearm.

11. The apparatus of claim 10 wherein said end wall has a hole therein, said hole extending transversely of said supporting surface.

12. A firearm securement system for mounting a firearm to an essentially planar surface, said firearm having a length, a stock end and a barrel end, said system comprising:

a first rigid support for internally receiving said stock end of said firearm, said first support comprising:

an end wall, said end wall of said first support having a first hole therein;

first and second opposed side walls, said side walls being separated by said end wall, said first hole extending normally to said side walls of said first support;

a floor, said floor being contoured to receive said stock end of said firearm; and, first attaching means for removably attaching said first support to said surface, said first hole receiving said first attaching means; and, a second rigid support for internally receiving said barrel end of said firearm, said second support comprising:

first and second opposed side walls;

an end wall, said end wall being between said side walls of said second support, said end wall of said second support has a second hole therein, said second hole extending normally to said side walls of said second support;

an interior surface, said interior surface being contoured to receive said barrel end of said firearm; and, second attaching means for removably attaching said second support to said surface, said second hole receiving said second attaching means.

13. The system of claim 12 wherein said first side wall of said second support has an edge, said edge being inwardly sloped.

* * * * *